Sept. 19, 1967  W. I. KAYE  3,342,099
SCATTERED LIGHT SPECTROPHOTOMETER
Filed Feb. 26, 1963  2 Sheets-Sheet 1

INVENTOR.
WILBUR I. KAYE
BY HIS ATTORNEYS
HARRIS, KIECH, RUSSELL & KERN

Sept. 19, 1967  W. I. KAYE  3,342,099
SCATTERED LIGHT SPECTROPHOTOMETER
Filed Feb. 26, 1963  2 Sheets-Sheet 2
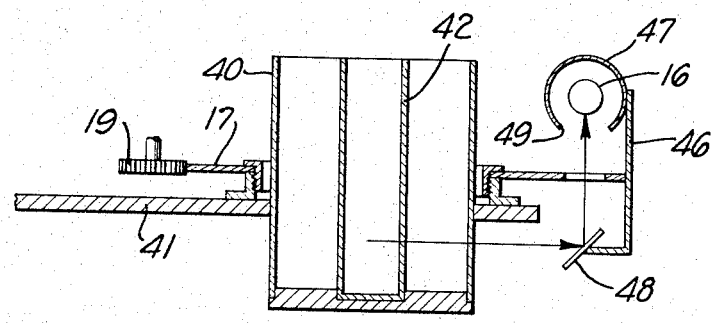
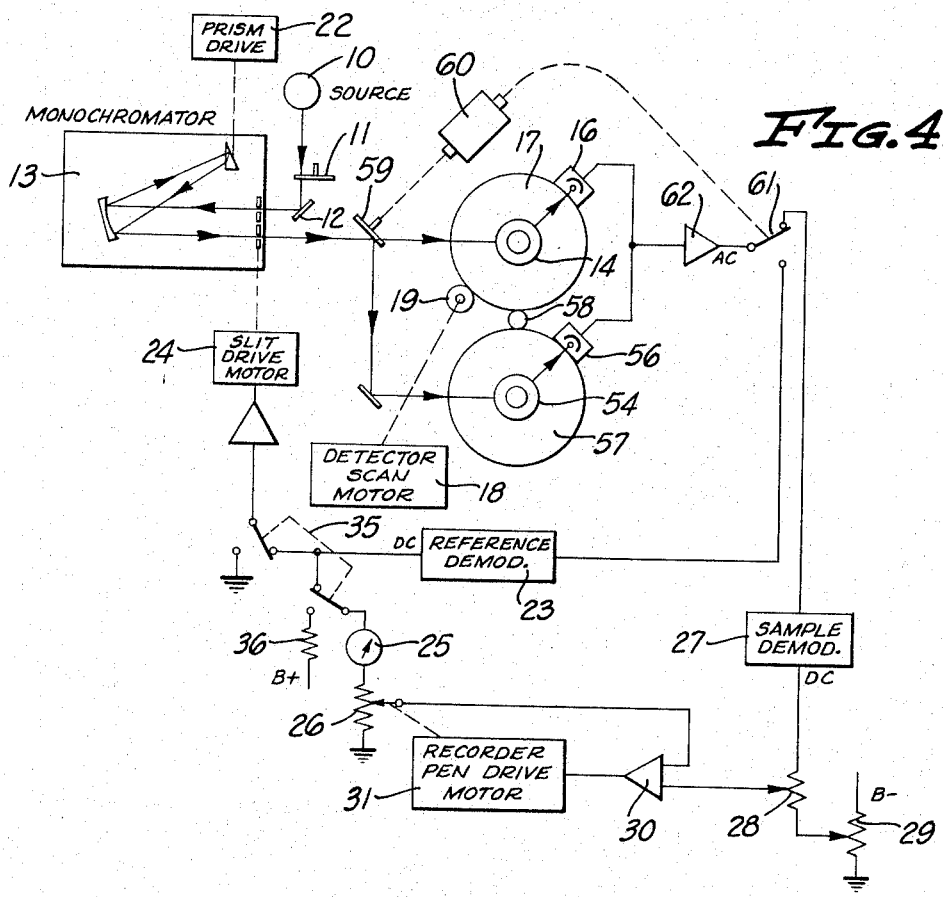
INVENTOR.
WILBUR I. KAYE
BY HIS ATTORNEYS
HARRIS, KIECH, RUSSELL & KERN

United States Patent Office 3,342,099
Patented Sept. 19, 1967

3,342,099
SCATTERED LIGHT SPECTROPHOTOMETER
Wilbur I. Kaye, Fullerton, Calif., assignor to Beckman Instruments, Inc., a corporation of California
Filed Feb. 26, 1963, Ser. No. 261,066
3 Claims. (Cl. 88—14)

This invention relates to apparatus and methods for measuring the light scattering characteristics of samples.

In the measurement of light scattering characteristics, it is sometimes desired to determine the scattered light from a sample as a function of angle with respect to the excitation beam. It is sometimes desired to determine the ratio of scattered light from the sample to the transmission or absorbence of the sample and also the ratio of scattered light from the sample and from a reference. It is sometimes desirable to determine the light scattering characteristics of a sample as a function of wavelength of the exciting radiation. It is an object of the present invention to provide new and improved methods and apparatus for performing such analyses. A particular object is to provide such equipment which may be used in conjunction with existing spectrophotometers.

It is an object of the invention to provide an instrument for scattered light measurement including a radiation source, a sample cell and a reference cell, a pair of radiation detectors, means for converting radiation at each detector to an electrical signal, means defining an incident beam path from the source to the sample cell, detector mounting means for mounting one of the detectors adjacent the sample cell and including a scattered light path from the sample cell to the detector, means defining an incident beam path from the source to the reference cell, detector mounting means for mounting the other detector adjacent the reference cell and including a scattered light path from the reference cell to the detector and means for moving the detectors in a path about their respective cells to provide a measure of scattered light from the sample with respect to scattered light from the reference as a function of angle with respect to the incident beam. A further object is to provide such an instrument in which the angle drive for the detector may be manual or may be motor driven. A particular object is to provide such an instrument in which the angle drive motor may also be used to drive the recorder to provide a plot of scattered radiation versus angle.

It is an object to provide such an instrument which may incorporate a monochromator at the radiation source to provide a narrow band of excitation. A further object is to provide such an instrument in which the monochromator may be scanned to provide a measurement over a wide spectrum.

A further object is to provide such an instrument in which the radiation scattered by the reference may be used to provide a control for energy in the excitation beam, as by utilizing a slit servo and a monochromator, and may be used to provide a measure of the ratio of the sample to reference scattered radiation.

It is an object of the invention to provide such an instrument which may incorporate means for driving the two detectors in synchronism, and means for alternately directing the excitation to the two cells, with one cell carrying a reference material and the other cell carrying the sample. Another object is to provide such an instrument which may incorporate a beam switcher and a single scattered light cell with the radiation beam directed alternately to the scattered light cell and to a second detector to provide a reference signal for use in beam energy control and/or ratio recording.

The invention also comprises novel details of construction and novel combinations and arrangements of parts, which will more fully appear in the course of the following description. The drawings merely show and the description merely describes preferred embodiments of the present invention which are given by way of illustration or example.

In the drawings:

FIG. 3 is a sectional view taken along the line 3—3 of FIG. 2; and

FIG. 4 is a diagram of an alternative form of the instrument.

Figure 1:
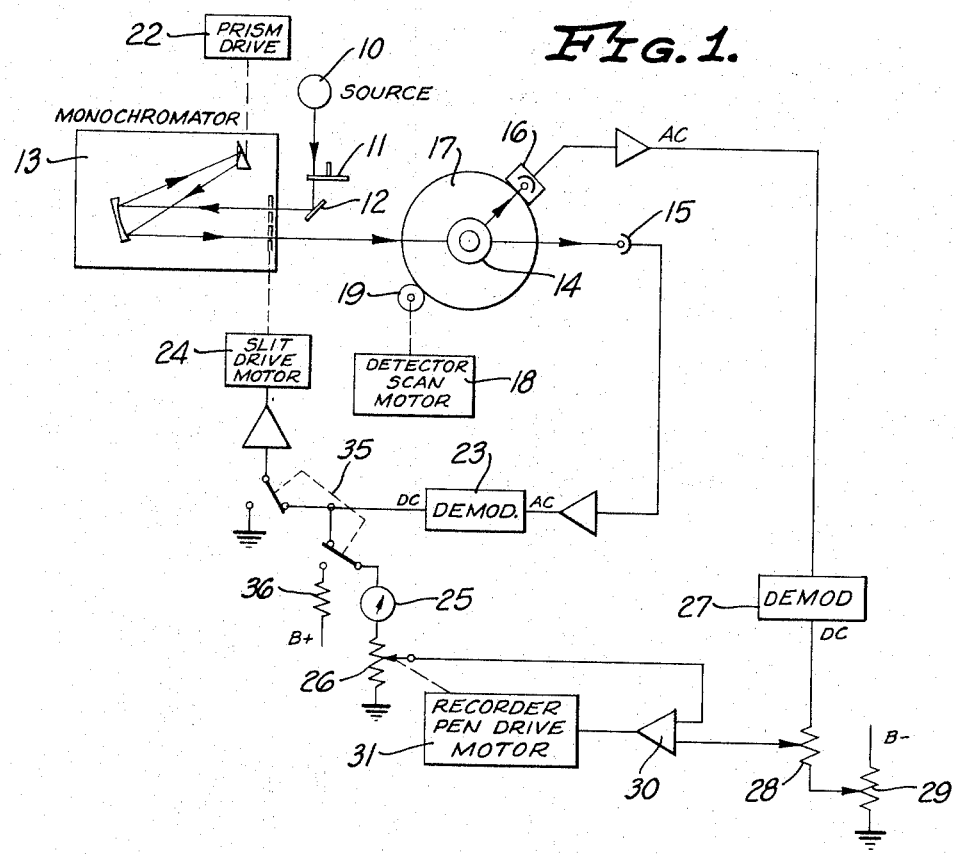
FIG. 1 is a diagram of a preferred form of the instrument.

The preferred form of the instrument shown in FIG. 1 includes a radiation source 10, a beam chopper or modulator 11, and a mirror 12 for directing a modulated beam through the entrance slit of a monochromator 13. The beam from the exit slit of the monochromator is directed through a sample cell 14 to a detector 15. Another detector 16 is carried on a rotating plate 17 for moving the detector 16 in an arcuate path about the sample cell 14. The plate 17 may be rotated manually or by a detector scan motor 18 through a gear drive 19.

The beam chopper 11 may be a motor driven, apertured disc that interrupts the beam at a suitable frequency, typically 480 cycles per second. The entrance and exit beams in the monochromator are shown side by side for purposes of clarity. Ordinarily, the entrance and exit beams will be disposed one above the other to permit useage of a single pair of slit jaws. The monochromator 13 sorts or disperses the radiation of the source to provide a narrow band of radiation at the sample cell and this narrow band may be scanned over a wide spectrum by rotating the prism with a prism drive 22. Of course, other types of monochromators may be utilized, various filters may be utilized, and radiation sources may be used directly, depending upon the type of excitation desired for the measurement being carried out.

The electrical signal produced at the detector 15 is amplified and directed to a demodulator 23. The output of the demodulator, normally referred to as the reference signal, is normally connected through an amplifier to a slit drive motor 24 which controls the slit size and hence the energy in the beam to the sample cell. This slit width control circuit provides for constant energy in the excitation path through the cell and thereby compensates for variations in source output and variations in instrument efficiency at various wavelengths. The reference signal from the demodulator 23 is also normally connected through an indicating meter 25 and a potentiometer 26 to circuit ground.

The electrical signal produced at the detector 16 is amplified and directed to another demodulator 27 to provide the sample signal. The output of the demodulator 27 is connected through a first potentiometer 28 and the arm of a second potentiometer 29 to circuit ground. The potentiometers 26, 28 provide the inputs to a differential amplifier 30 for energizing a pen drive motor 31. The pen drive motor drives the marking pen of a suitable chart recorder and also has a feedback connection to the arm of the potentiometer 26. When operated as shown in FIG. 1, the recorder provides a record of the ratio of the radiation along the path to the detector 16 and along the path to the detector 15. The potentiometer 28 provides for setting the 100% point on the ratio recording scale and the potentiometer 32 provides for setting the zero point on the ratio recording scale.

A switch 35 in the output circuit of the demodulator 23 provides for disconnecting the slit drive motor and amplifier and the pen drive motor and amplifier from the reference signal. The input to the slit drive motor amplifier is connected to circuit ground and the meter 25 and potentiometer 26 are connected to a reference voltage through a resistor 36 when the switch 35 is actuated. When the switch 35 is so actuated, the sample signal which varies as a function of the energy at the detector 16 provides the only input signal to the amplifier 30 and hence the recorder signal is a direct measure of the energy of radiation arriving at the detector 16.

Figure 2:
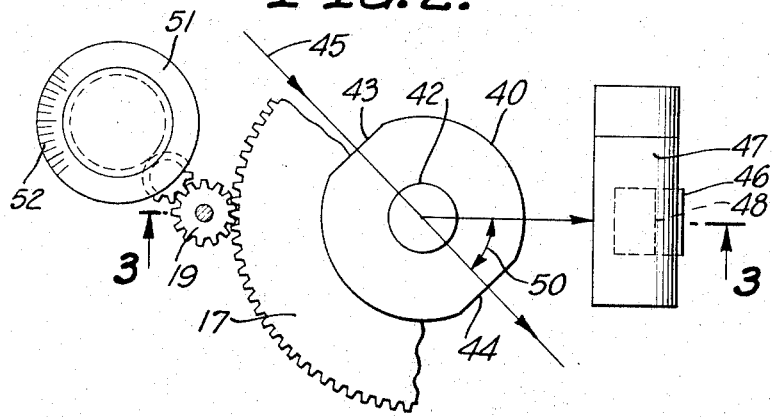
FIG. 2 is a top view of a scattered light cell unit for use in the instrument of FIG. 1.

The structure of the cell unit is shown in greater detail in FIGS. 2 and 3. A cylindrical container 40 is carried in a base 41. A second cylindrical container 42 is concentrically positioned within the container 40. Flat zones of faces 43, 44 are provided on the outer surface of the outer container 40 with the faces parallel to each other and normal to the path 45 of the excitation beam. The sample to be analyzed is placed in the inner container 42 and a liquid of approximately the same index of refraction as the sample is usually placed in the outer container 40. With this cell structure and arrangement, reflection of the cell walls is practically eliminated and radiation from the sample due to scattering of the exciting beam can be measured over a wide angular range.

The plate 17 is mounted on the base 41 for rotation about the axis of the cylindrical containers. The detector 16 is carried on the plate 17, as by a bracket 46 and housing 47. A mirror 48 carried on the plate 17 and an opening 49 in the housing 47 provide a beam path for scattered light from the inner container 42 to the detector 16. With the structure shown herein, the angle 50 at which scattered light is measured relative to the exciting beam path 45 may be scanned over the range of about 15° to 150°. The angle of acceptance of a typical photomultiplier used as a detector is approximately five degrees, thereby providing a quite narrow scan for angular measurement of scattering. The gear drive 19 also drives an indicator disc 51 past an index mark 52 to provide a visual indication of the angle 50.

In a typical analysis, the sample is placed in the cell, the monochromator prism drive is adjusted to provide radiation at the desired wavelength, the switch 35 is thrown to the reverse of the position shown in FIG. 1, and the detector 16 is scanned over the angular range of 15 to 150°. In another mode of operation, the detector 16 may be maintained stationary and the variation in scattering radiation measured as a function of time. In another alternative mode, the detector 16 may be maintained stationary and the monochromator scanned over a spectrum.

The angular scan, the time rate of change measurement, and the source scan may be utilized with the switch 35 in the position shown in FIG. 1 to provide a record of the ratio of scattering radiation to transmitted radiation and with constant energy in the reference path.

FIG. 4 illustrates an alternative form of the instrument in which components corresponding to those of the instrument of FIG. 1 are identified by the same reference numerals. A reference cell unit comprising a cell 54, a detector 56 and plate 57, is provided adjacent the sample cell unit with the plate 57 driven in synchronism with the plate 17 through an idler gear 58. The beam from the exit slit of the monochromator 13 is directed to a rotating half mirror 59 and then along alternate paths to the sample cell 14 and reference cell 54. The mirror 59 is driven by a motor 60 which also drives a commutator 61 in synchronism with the rotating half mirror 59. Typically this beam switching system may be identical to that of a conventional dual beam spectrophotometer with the scattered light cell units substitued for the conventional reference and sample cells.

The electrical signals from the detectors 16 and 56 are combined, amplified in an amplifier 62, and alternately directed to the sample demodulator 27 and the reference demodulator 23 by the commutator 61. That portion of the amplified signal due to scattering radiation from the sample cell is directed to the sample demodulator and that portion of the signal due to radiation from the reference cell is directed to the reference demodulator. With this arrangement, the recorded output is the ratio of the scattering due to the sample and the reference material. In an alternative arrangement, the commutator 61 could be omitted with the signals from the detectors coupled to the corresponding demodulators through separate amplifiers.

In another alternative mode of operation, the beam switching system of FIG. 4 can be utilized with the reference cell omitted. The reference detector is then positioned in the reference path for direct radiation or for radiation through a similar sample cell to provide the reference signal.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In an instrument for scattered light measurement, the combination of:
    a radiation source;
    a sample cell;
    a reference cell;
    a first radiation detector for producing a sample electrical signal varying as a function of incident radiation;
    a second radiation detector for producing a reference electrical signal varying as a function of incident radiation;
    a beam switcher including means for directing radiation from said source alternately to said sample cell and reference cell;
    first detector mounting means for mounting said first detector adjacent said sample cell and including a scattered light path from said sample cell to said first detector;
    second detector mounting means for mounting said second detector adjacent said reference cell and including a scattered light path from said reference cell to said second detector; and
    means for moving said detectors in synchronism in paths about the corresponding cells to provide sample and reference scattered light signals varying as a function of angle with respect to the incident beams.

2. In an instrument for scattered light measurement, the combination of:
    a radiation source;
    a sample cell;
    a reference cell;
    a first radiation detector for producing a sample electrical signal varying as a function of incident radiation;
    a second radiation detector for producing a reference electrical signal varying as a function of incident radiation;
    a beam switcher including means for directing radiation from said source alternately to said sample cell and reference cell and including a monochromator between said source and beam switcher;
    a split jaw motor for varying the beam slit size in said monochromator;
    first detector mounting means for mounting said first detector adjacent said sample cell and including a scattered light path from said sample cell to said first detector;
    second detector mounting means for mounting said second detector adjacent said reference cell and including a scattered light path from said reference cell to said second detector;
    means for moving said detectors in synchronism in paths about the corresponding cells to provide sample and reference scattered light signals varying as a function of angle with respect to the incident beams;

first circuit means having said reference signal as an input for driving said slit jaw motor to maintain the reference signal substantially constant;

recorder drive means; and second circuit means having said reference and sample signals as inputs for driving said recorder drive means to record the ratio of said signals.

3. In an instrument for scattered light measurement, a cell unit including:

a base;

a sample cell support mounted on said base and having a sample cell axis;

a reference cell support mounted on said base and having a reference cell axis;

a first detector support plate mounted on said base for pivoting movement about said sample cell axis;

a second detector support plate mounted on said base for pivoting movement about said reference cell axis;

a first radiation detector mounted on said first support plate and including means defining a sample radiation path from said sample cell axis to said first detectors;

a second radiation detector mounted on said second support plate and including means defining a reference radiation path from said reference cell axis to said second detector;

drive means for rotating said plates about the respective axes in synchronism; and means for indicating the angular position of one of said radiation paths in a plane normal to the corresponding cell axis.

References Cited

UNITED STATES PATENTS

| 2,874,606 | 2/1959 | Leiterer | 88—14 |
| 2,888,623 | 5/1959 | Atwood | 88—14 |
| 3,207,996 | 9/1965 | Sundstrom | 88—14 |
| 3,242,796 | 3/1966 | Strickler | 88—14 |

OTHER REFERENCES

Zimm: "Apparatus and Methods etc.," J. Chem. Phys., vol. 16, No. 12, December 1948, pp. 1099–1107.

Baum: "Automatic Photometer for Measuring the Angular Dissymmetry of Light Scattering," J.O.S.A., vol. 51, No. 4, April 1961, pp. 452–456.

Witnauer: "Cylindrical Light Scattering Cell," Review of Scientific Instruments, vol. 23, No. 2, pp. 99–100, February 1952.

Weissberger: "The Technique of Organic Chemistry," vol. I, Physical Methods, Part III, Interscience, 1960, pp. 2131–2132.

Casassa: "A Thermostat for Light Scattering Measurements," Journal of Polymer Science, vol. 14, October 1954, pp. 385–389.

JEWELL H. PEDERSEN *Primary Examiner.*

E. S. BAUER, *Assistant Examiner.*